Aug. 7, 1951  J. W. PARKER  2,563,061
MICROMETER THIMBLE
Filed Jan. 15, 1947

INVENTOR.
John W. Parker
BY
Barlow & Barlow
ATTORNEYS.

Patented Aug. 7, 1951

2,563,061

UNITED STATES PATENT OFFICE 2,563,061

MICROMETER THIMBLE

John W. Parker, West Barrington, R. I., assignor to Brown & Sharpe Manufacturing Company, a corporation of Rhode Island Application January 15, 1947, Serial No. 722,111

7 Claims. (Cl. 33—164)

This invention relates to a micrometer or micrometer gauge and more particularly to the thimble which is attached to the spindle thereof.

It is usual in the manufacture of a micrometer gauge to solder the thimble to the screw of the spindle in the manufacture of such gauge as illustrated in my Patent 1,629,406, dated May 17, 1927. Some difficulties are encountered in the accurate setting of the thimble with respect to the spindle and accomplishing this soldering operation, and after this soldering attachment is once made, no mechanical adjustment by the user of the gauge can be had.

One object of this invention is to attach the thimble to the spindle in such a way that it may be easily adjusted for initial setting at the factory.

Another object of this invention is to provide an attachment of thimble to the spindle or micrometer screw such that it may be adjusted by the individual user after there has been wear of one or both of the contact points of the gauge.

Another object of this invention is to provide a thimble for a micrometer gauge in which there may be independent rotative and axial adjustments in order that the indicia lines may be accurately set for indicating the reading of the micrometer.

With these and other objects in view, the invention consists of certain novel features of construction as will be more fully described and particularly pointed out in the appended claims.

Figure 1:
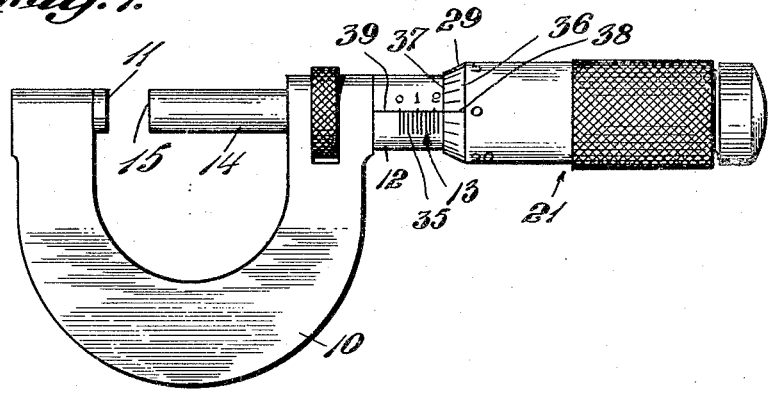
Fig. 1 is a side elevation of the micrometer gauge.
Figure 2:
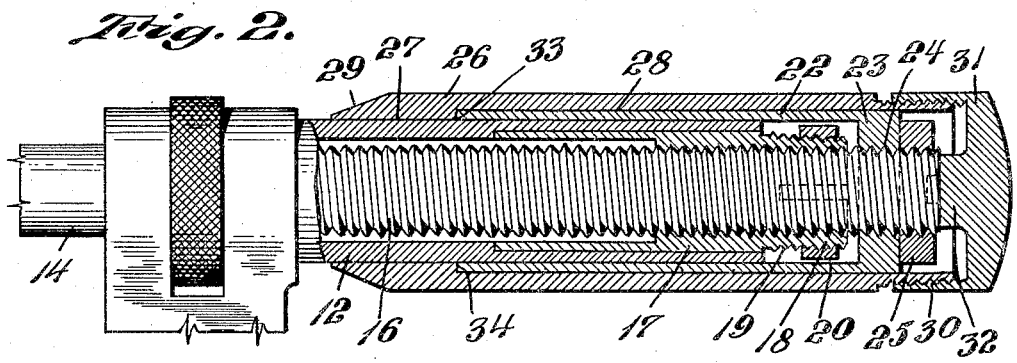
Fig. 2 is a fragmental view showing the thimble and barrel in section.

In proceeding with this invention, I form the thimble in two parts. The sleeve part is threaded to the screw which is fixed to the spindle and may be axially adjusted and locked in position. The outer member is relatively rotatable with reference to the sleeve and may be secured to the micrometer screw and spindle in any rotative adjusted position. By this arrangement, both an axial setting as well as a rotative setting of the thimble relative to the spindle and screw may be had.

With reference to the drawings, 10 designates the frame or body of the micrometer gauge which is provided with an anvil 11 and a barrel 12 which extends from this body. This barrel is graduated as at 13. The spindle 14 has a contact end 15 to engage work when placed between it and the anvil 11 and this spindle has fixed thereto the threaded screw 16 which extends into the barrel 12 and threadingly engages the bushing 17 which is held within this barrel 12. This bushing is split at its end portion 18 with a tapered external thread 19 to be engaged by the nut 20 and contracted for taking up any wear which may occur between the threads of the screw 16 and internal threads of this bushing 17.

The threads of this micrometer screw, which is an extension of the spindle 14, extend to the very end of this member so as to afford a space beyond the bushing upon which the thimble may be mounted.

The thimble designated generally 21 consists of a sleeve 22 which has a thickened portion 23 threaded as at 24 to engage the threads 16 on the end portion of the micrometer screw; while a nut 25, also engaging these threads, will engage the end of this sleeve and lock the same in adjusted position on the micrometer screw. The outer member 26 of the thimble consists of a cylindrical member having an internal bore 27 of a size to rotatably receive and be axially guided by the barrel 12, while there is a larger bore 28 of a size to rotatively receive and be axially guided by the sleeve 22. This thimble is beveled as at 29 so as to provide a chisel edge on the barrel. Threads 30 are located on the outer surface of the handle end of the thimble, and a cap 31 engages these threads and has a contacting face 32 which will engage the end of the micrometer screw 16 so as to provide an abutment to draw the outer member 26 of the thimble so that its shoulder 33, between the bores 27 and 28, will engage the end 34 of the sleeve and will then provide sufficient friction to hold the thimble locked with reference to the micrometer screw.

Indicia or rotary markings 35 are provided on the barrel 12 and markings 36 are provided on the beveled surface 29 of the sleeve in order that the position of the contact end 15 of the spindle may be known.

In setting this instrument, the contact end 15 is moved into engagement with the anvil 11. The cap 31 is removed from the thimble and nut 25 is loosened, and the thimble is then set by turning the outer member 26 and sleeve 22 until the edge 37 of the thimble aligns with the "0" line on the barrel. When this occurs, the nut 25 clamps the sleeve in its adjusted axial position. The outer member 26 of the thimble is then rotated circularly about the barrel until its "0" line 38 splits the line 39 on the barrel, and then the cap 31 is placed on the thimble so as to bind the two parts of the thimble together; and by engagement with the screw at its end, bind the outer sleeve to this screw. Thereafter, the thimble and micrometer screw and spindle all turn together as a unit. Should the surface 15 or the surface of the anvil 11 become worn, the parts may be again reset by going through the above operations without the necessity of any solder and the necessity of accurately holding the parts for resoldering them in position after adjustment.

One of the advantages of this invention is that when the anvil and spindle faces need trimming up, the "0" line on the barrel is not covered up by the edge of the thimble as it advances the necessary distance to compensate for the amount taken off the contact faces. The prior art two-piece thimbles, such as in Parker Patent No. 1,629,406, have rotative adjustment only and cannot be "backed up" axially after re-establishing contact between the anvil and spindle faces. A more important advantage, however, is the convenience of manufacturing micrometers. Solid, one-piece thimbles are known which thread or are otherwise directly secured to the measuring screw end of the spindle. When once set correctly in manufacture, they are correct for all future adjustments which may be necessary, since the thimble is directly secured to the screw which advances the spindle to make contact with the anvil face after trimming up has been accomplished. This advances the thimble both rotatively and axially, but the thimble retracts also both rotatively and axially in step to bring back the "0" line on the thimble to the original setting. In order to do this, the spindle is held manually while the thimble is backed up. Such thimble constructions, however, present serious manufacturing difficulties. An ungraduated thimble must be advanced on the measuring screw until the beveled end of the thimble bisects the first vertical line on the barrel. When thus located, a spot must be made on the thimble bevel where the "0" line is to be graduated in order to line up with the horizontal line on the barrel in the finished tool. The thimble cannot be graduated first. Further, the thimble which has been marked for a particular micrometer must remain with that micrometer, causing constant watchfulness in graduating the thimble that it does not lose its identity with the complete micrometer with which it is to be finally assembled. Any one of a number of mass-produced, pre-graduated thimbles cannot be used if the proper registry is to be made in such thimbles.

In the invention which is the subject of this application, such objectionable shop practices have been overcome without sacrificing the desired result. The thimble outer members and sleeves can be mass-produced, and pre-graduated with the full assurance that any one of a quantity of each can be assembled on any micrometer and, by the independent adjustment made possible by the invention, set with the thimble in proper registry rotatively and axially.

I claim:

1. In a micrometer, a spindle provided with threads, a thimble comprising an outer member and an inner sleeve, threads on said sleeve engaging the threads on said spindle to axially adjust the same thereon, means to lock the sleeve in position relative to said spindle, and means to secure said outer member to the spindle in desired adjusted rotative position with reference thereto.

2. In a micrometer, a spindle, a thimble comprising an outer member and an inner sleeve, binding means to adjustably and releasably secure the sleeve to the spindle in desired axial position therealong and threads on said outer member and a cap engaging said threads and the end of said spindle to lock the member in relative rotative position with reference to the spindle.

3. In a micrometer, a spindle provided with threads, a thimble comprising an outer member and an inner sleeve, threads on said sleeve engaging the threads on said spindle to axially adjust the same thereon, means to lock the sleeve in position relative to the spindle, threads on said outer member and a cap engaging said threads and the end of said spindle to lock the member in relative rotative position with reference to the spindle.

4. In a micrometer, a spindle, a thimble comprising an outer member and an inner sleeve, said outer member telescoping said sleeve and having a shoulder to engage the end of said sleeve, binding means to adjustably and releasably secure the sleeve to the spindle in desired axial position therealong and binding means adjustably and releasably to secure said outer member to the spindle with said shoulder engaging the end of said sleeve and in desired rotative position with reference thereto.

5. In a micrometer, a spindle provided with thread, a thimble comprising an outer member and an inner sleeve, said outer member telescoping said sleeve and having a shoulder to engage the end of said sleeve, threads on said sleeve engaging the threads on said spindle to axially adjust the same thereon, means to lock the sleeve in position relative to the spindle and threads on said outer member and a cap engaging said threads and the end of said spindle to lock the member in relative rotative position with reference to the spindle, with the shoulder engaging the end of said sleeve.

6. In a micrometer, a spindle, threads on a portion of said spindle, a thimble comprising an outer member and an inner sleeve, said outer member telescoping said sleeve and having a shoulder to engage the end of said sleeve, threads on said sleeve engaging the threads on said spindle to axially adjust the same thereon, a check nut on the spindle engaging the sleeve to lock the sleeve in position relative to the spindle and threads on said outer member and a cap engaging said threads and the end of said spindle to lock the member in relative rotative position with reference to the spindle, with the shoulder engaging the end of said sleeve.

7. In a micrometer, a spindle, threads on a portion of said spindle, a thimble comprising an outer member and an inner sleeve, adjustable and releasable binding means engaging the inner sleeve and the threads on the spindle to secure the sleeve to the spindle in axially adjusted position therealong, separate binding means to adjustably and releasably secure the outer member to the spindle in desired rotative position with reference thereto, each of said binding means being operable independently of the other.

JOHN W. PARKER.

REFERENCES CITED

The following references are of record in the file of this patent:

UNITED STATES PATENTS

| Number | Name | Date |
|---|---|---|
| 648,390 | Coe | May 1, 1900 |
| 827,453 | Leach et al. | July 31, 1906 |
| 1,629,406 | Parker | May 17, 1927 |
| 1,763,941 | Witchger | June 17, 1930 |

FOREIGN PATENTS

| Number | Country | Date |
|---|---|---|
| 376,214 | Germany | May 25, 1923 |
| 554,429 | Great Britain | July 2, 1943 |